United States Patent
Zheng et al.

(10) Patent No.: US 10,533,109 B2
(45) Date of Patent: Jan. 14, 2020

(54) STABLE AQUEOUS FLUOROPOLYMER COATING COMPOSITION

(71) Applicant: Arkema Inc., King of Prussia, PA (US)

(72) Inventors: Min Zheng, Berwyn, PA (US); Ramin Amin-Sanayei, Malvern, PA (US); Qing Li, Audubon, PA (US); An Du, Blue Bell, PA (US)

(73) Assignee: Arkema Inc., King of Prussia, PA (US)

( * ) Notice: Subject to any disclaimer, the term of this patent is extended or adjusted under 35 U.S.C. 154(b) by 293 days.

(21) Appl. No.: 15/500,707

(22) PCT Filed: Jun. 25, 2015

(86) PCT No.: PCT/US2015/037571
§ 371 (c)(1),
(2) Date: Jan. 31, 2017

(87) PCT Pub. No.: WO2016/003748
PCT Pub. Date: Jan. 7, 2016

(65) Prior Publication Data
US 2017/0253760 A1  Sep. 7, 2017

Related U.S. Application Data

(60) Provisional application No. 62/019,523, filed on Jul. 1, 2014.

(51) Int. Cl.
| | |
|---|---|
| *C09D 127/16* | (2006.01) |
| *C09D 7/65* | (2018.01) |
| *C09D 7/20* | (2018.01) |
| *C09D 5/00* | (2006.01) |

(52) U.S. Cl.
CPC ............ *C09D 127/16* (2013.01); *C09D 5/00* (2013.01); *C09D 7/20* (2018.01); *C09D 7/65* (2018.01)

(58) Field of Classification Search
CPC combination set(s) only.
See application file for complete search history.

(56) References Cited

U.S. PATENT DOCUMENTS

| | | | |
|---|---|---|---|
| 3,111,426 A | 11/1963 | Capron et al. | |
| 3,301,807 A | 1/1967 | Juzaemon Hoashi | |
| 3,526,532 A | 9/1970 | Helberger | |
| 4,016,125 A * | 4/1977 | Vassiliou | C09D 1/04 524/111 |
| 4,022,737 A * | 5/1977 | Sekmakas | C08J 3/03 524/376 |
| 4,179,542 A | 12/1979 | Christofas et al. | |
| 4,383,075 A * | 5/1983 | Abel | C09D 127/12 524/512 |
| 4,869,955 A * | 9/1989 | Ashcraft | G03G 7/004 428/327 |
| 5,599,873 A * | 2/1997 | Verwey | C09D 127/16 524/545 |
| 5,804,650 A | 9/1998 | Tsuda et al. | |
| 6,063,855 A * | 5/2000 | Pecsok | C09D 127/16 524/501 |
| 6,326,437 B1 | 12/2001 | Tsuda et al. | |
| 6,359,030 B1 | 3/2002 | Tsuda et al. | |
| 6,528,574 B1 * | 3/2003 | Levy | C08L 27/18 524/520 |
| 6,551,708 B2 * | 4/2003 | Tsuda | C09D 127/16 428/402 |
| 6,635,714 B1 * | 10/2003 | Wood | C08L 27/16 525/199 |
| 6,642,307 B1 * | 11/2003 | Sogabe | C08F 14/18 516/75 |
| 6,680,357 B1 | 1/2004 | Hedhli et al. | |
| 6,696,512 B2 | 2/2004 | Poggio et al. | |
| 7,399,533 B2 | 7/2008 | Zheng et al. | |
| 7,605,194 B2 | 10/2009 | Ferencz et al. | |
| 7,803,867 B2 | 9/2010 | Hanrahan et al. | |
| 8,093,329 B2 | 1/2012 | Seneker et al. | |
| 8,395,059 B2 | 3/2013 | Miyazaki et al. | |
| 8,557,895 B2 | 10/2013 | Ferencz et al. | |
| 9,139,668 B2 | 9/2015 | Zipplies et al. | |
| 9,202,638 B2 | 12/2015 | Amin-Sanayei et al. | |

(Continued)

FOREIGN PATENT DOCUMENTS

| | | | | |
|---|---|---|---|---|
| CN | 1896137 A | * | 1/2007 | |
| FR | 2765878 A1 | * | 1/1999 | ............ C08F 220/12 |
| JP | 52058733 A | * | 5/1977 | |
| JP | S5258733 A | | 5/1977 | |
| JP | S59157159 A | | 9/1984 | |
| JP | 200753912 A | | 3/2007 | |
| JP | 2007170045 A | | 7/2007 | |
| WO | 2005000914 A1 | | 1/2005 | |
| WO | WO-2010088801 A1 | * | 8/2010 | ............ A47J 23/06 |

OTHER PUBLICATIONS

Machine translation of FR 2765878 A1, retrieved Aug. 2019. (Year: 2019).*
Abstract of CN 1896137 A, 2007 (Year: 2007).*

*Primary Examiner* — Nicole M. Buie-Hatcher
(74) *Attorney, Agent, or Firm* — Joanne Rossi

(57) ABSTRACT

The invention relates to a high shear stable aqueous fluoropolymer coating composition, preferably using polyvinylidene fluoride (PVDF), such as KYNAR® PVDF, suitable for high performance coating applications. The composition is based on a high shear stable fluoropolymer emulsion having small particle size, blended with an acrylic polymer additive. The use of this composition allows high bake PVDF water-base coatings which can be applied on variety of substrates such as metal or ceramic surfaces, and in the impregnation of textiles, glass, carbon or aramid fibers, etc. The dry coating formed from the coating composition of the invention exhibits improved gloss, crack resistance, chemical resistance, hot dirt pick up resistance and other improved properties.

19 Claims, No Drawings

(56) References Cited

U.S. PATENT DOCUMENTS

| | | | |
|---|---|---|---|
| 2003/0204018 A1* | 10/2003 | Granel | C09D 133/06 |
| | | | 525/100 |
| 2005/0004300 A1 | 1/2005 | Overbeek et al. | |
| 2005/0062023 A1* | 3/2005 | Korzhenko | C08L 27/16 |
| | | | 252/500 |
| 2006/0189719 A1* | 8/2006 | Ambrose | C09D 5/03 |
| | | | 523/333 |
| 2006/0264563 A1 | 11/2006 | Hanrahan et al. | |
| 2007/0142541 A1* | 6/2007 | Hintzer | B01F 17/0035 |
| | | | 524/544 |
| 2009/0258987 A1 | 10/2009 | Ambrose et al. | |
| 2011/0118403 A1 | 5/2011 | Wood et al. | |
| 2012/0015246 A1 | 1/2012 | Amin-Sanayei et al. | |
| 2012/0129982 A1 | 5/2012 | Zipplies et al. | |
| 2012/0202082 A1 | 8/2012 | Fujii | |
| 2012/0283382 A1* | 11/2012 | Spada | C08F 14/22 |
| | | | 524/712 |
| 2014/0221556 A1* | 8/2014 | Yoshida | C08F 259/08 |
| | | | 524/520 |
| 2015/0299342 A1* | 10/2015 | Nanba | C08F 14/26 |
| | | | 524/805 |
| 2016/0237298 A1 | 8/2016 | Jing et al. | |
| 2017/0022440 A1 | 1/2017 | Yu et al. | |

\* cited by examiner

STABLE AQUEOUS FLUOROPOLYMER COATING COMPOSITION

This application claims benefit, under U.S.C. § 119 or § 365 of PCT Application Number PCT/US2015/037571, filed Jun. 25, 2015, and U.S. Provisional Application No. 62/019,523, filed Jul. 1, 2014.

FIELD OF THE INVENTION

The invention relates to a high shear stable aqueous fluoropolymer coating composition, preferably using polyvinylidene fluoride (PVDF), such as KYNAR® PVDF, suitable for high performance coating applications. The composition is based on a high shear stable fluoropolymer emulsion having small particle size, blended with an acrylic polymer additive. The use of this composition allows high bake PVDF water-base coatings which can be applied on variety of substrates such as metal or ceramic surfaces, and in the impregnation of textiles, glass, carbon or aramid fibers, etc. The dry coating formed from the coating composition of the invention exhibits improved gloss, crack resistance, chemical resistance, hot dirt pick up resistance and other improved properties.

BACKGROUND OF THE INVENTION

High performance coatings formulated from polyvinylidene fluoride (PVDF) polymer resins are known to provide good solvent resistance, chemical resistance, weather resistance, heat stability, strength and resilience. PVDF solvent-base coatings (e.g. KYNAR 500®) have been usually used on metal substrates. U.S. Pat. Nos. 8,093,329 and 7,399,533 describe coating compositions based on non-aqueous dispersions of solid PVDF particles in an organic solution of acrylic polymers. The coating compositions contain PVDF powders, organic solvents, acrylic polymers, and optionally pigments and colorants. After baking the coating above the PVDF melting temperature, a homogenous blend of PVDF and acrylic phase is formed which provides the coating with durability and other essential properties such as gloss, adhesion, solvent resistance, and weatherability.

PVDF-based paints commonly contain high levels of organic solvents, which are needed to dissolve acrylics and disperse PVDF. These organic solvents are typically classified as volatile organic compounds (VOCs) and are often regulated in their use. The organic-solvent-based slurry presents safety, health and environmental dangers that are not present in an aqueous system. Organic solvents are generally toxic and flammable, volatile in nature, and involve special manufacturing controls to mitigate risk and reduce environmental pollution from the organic solvent. In addition, a large carbon footprint is associated with use of organic solvents that is not environmentally desirable. Further, extra manufacturing steps, costing time, money, and energy are involved to isolate PVDF formed in an aqueous media, drying the PVDF to a powder, and then dissolving/dispersing the powder in a solvent.

There is a need for a fluoropolymer-base coatings and films which maintain these excellent properties, but which are more environmentally-friendly and aqueous-based.

To effectively employ waterborne slurries in coating formulation processes, it is important to develop binder systems that are compatible with current manufacturing practices and provide desired properties of the intermediate and final products. Some common criteria include: a) stability of the waterborne fluoropolymer dispersion, having sufficient shelf-life, b) compatibility with acrylic latexes c) stability of the slurry after admixing the powdery materials and pigments, and d) appropriate viscosity of the slurry to facilitate good aqueous casting. Additionally, from a regulatory view, fluoropolymers made without fluorosurfactants are preferred.

PVDF emulsions generally provide particle diameters above about 250 nm. These emulsions have reduced colloidal stability and are highly unstable when neutralized, or used under high shear conditions such as in a spray application.

One means to provide a stable, aqueous PVDF composition is through fluoropolymer and acrylic hybrid compositions made by a sequential emulsion polymerization process, as taught in U.S. Pat. No. 5,804,650 and US2011/0118403. These hybrid compositions involve the polymerization of acrylic monomer(s) in the presence of a fluoropolymer seed resin, producing the PVDF/acrylic hybrid emulsion. This aqueous hybrid composition can not be used at high baking condition due to the phase separation at elevated temperature (e.g. beyond 150° C.). The coating based on this hybrid latex requires a complicated polymerization processes while exhibiting inferior chemical resistance and hot dirt pick up resistance compare to this disclosure.

U.S. Pat. No. 3,301,807 describes an aqueous dispersion of PTFE fluoropolymers containing non-ionic surfactants where the fluoropolymer was made by using per-fluorinated surfactants. U.S. Pat. No. 6,696,512 describes fluoropolymer, and especially PTFE, aqueous dispersions made with fluorosurfactants, and having particle sizes of 240 microns and larger.

Stable fluorosurfactant-free PVDF emulsions have been produced by Applicant, using a variety of different surfactants, and producing emulsions having a particle size in the range of from 50 to 250 nm. Useful surfactants include 3-allyloxy-2-hydroxy-1-propane sulfonic acid (U.S. Pat. No. 6,869,997); polyvinylphosphonic acid, polyacrylic acid, polyvinyl sulfonic acid (U.S. Pat. No. 8,869,997), polyethylene glycol, polypropylene glycol, polytetramethylene glycol block co- and ter-polymers. Aqueous-based dispersions have been combined with powdery electrode forming materials and applied to electroconductive materials to form electrodes, as described in US 2010-0304270.

Surprisingly, a high shear stable aqueous fluoropolymer coating composition has been found, that is useful in high-bake coating applications. The fluoropolymer coating combines a fluoropolymer and a specific acrylic polymer to form a composition that is stable at high-bake temperatures of 200° C., and is shear stable under high shear forces, such as in a spray application. The aqueous fluoropolymer coating is useful in many applications, including protective and decorative coatings on metals and ceramics, as well as for the coating or impregnation of textiles, glass fibers, aramid fibers and carbon fibers.

The aqueous coating composition of the invention provides many advantages over similar solvent-based fluoropolymer coatings, including: it is more environmentally friendly and safer—with little or no exposure to solvents or solvent waste; it is easier to process (faster and cheaper) than similar solvent-based coatings—since the PVDF is synthesized as an emulsion, no separation step is required; the aqueous coating can be dried at a lower temperature than the solvent coatings—saving time and cost; higher gloss with a 60° gloss of greater than 60, and preferably greater than 70.

It is believed that the higher gloss is related to the polymer particle size in the dispersion being less than in the solvent-based coating compositions.

Further, dry coatings of the coating composition of the invention have excellent chemical resistance (MEK rub), and excellent dirt pick-up resistance.

SUMMARY OF THE INVENTION

The invention relates to a high shear stable aqueous fluoropolymer coating composition comprising:
   from 0.2 to 150 parts fluoropolymer particles having a volume average particle size of less than 250 nm, wherein said fluoropolymer comprises greater than 50 weight percent of fluoromonomer units; preferably the fluoropolymer is a polyvinylidene fluoride based polymer.
   from 1 to 150 parts of one or more acrylic latex;
   optionally from 0 to 50 parts of one or more thickeners;
   optionally, one or more pH adjusting agents;
   optionally from 0 to 50 parts of one or more additives selected from the group consisting of anti-settling agents and surfactants;
   optionally from 0 to 50 parts of one or more wetting agents;
   optionally from 0 to 50 parts of one or more coalescent agents;
   100 parts water;
all parts being parts by weight based on 100 parts by weight of water, and wherein the composition preferably contains no fluorosurfactant.

The invention further relates to a coating derived by applying the paint as defined in above composition aspect of the invention to a surface on which a coating is derived by evaporating the solvent/water contained in said paint or varnish.

The invention further relates to a coated article of manufacture, where the article is coated on one or more surfaces with the coating composition.

The invention further relates to the impregnation of fabrics with the coating compositions, and articles produced from the coated/impregnated fabric.

The invention further relates to a process for preparing the aqueous coating composition, and applying the coating composition to at least one surface of an article, to produce a coated article.

The acrylic latex used in the composition has a molecular weight in the range of 50,000 to 1,000,000 which provides a balance of both good adhesion and good chemical resistance. The acrylic latex is also made with specific surfactants, to reduce yellowing at high bake temperatures.

DETAILED DESCRIPTION OF THE INVENTION

The invention relates to a novel, high shear-stable aqueous fluoropolymer composition, useful in high bake coating applications, for articles coated with the coating composition, and for fabrics coated and/or impregnated with the coating composition.

All references listed in this application are incorporated herein by reference. All percentages in a composition are weight percent, unless otherwise indicated, and all molecular weights are given as weight average molecular weight as determined by a GPC method, unless stated otherwise.

By "fluorosurfactant free" is meant that all surfactants used in making the aqueous fluoropolymer do not contain a fluorine atom (are "non-fluorinated surfactants"). The term refers to all surfactants used in making and processing the aqueous fluoropolymer dispersion, as and preferably to all the surfactants in the composition of the invention, including: all surfactants used during the polymerization process—whether added up-front, fed continuously during the polymerization, fed partly before and then during polymerization, or fed after the polymerization has started and progressed for a time; and all preferably all surfactants added post-polymerization to improve latex stability.

By "high shear stable" and "high shear stability" is meant that the defined time to on-set of coagulation is greater than 20 min at 2000 rpm and/or greater than 4 min at 4000 rpm for PVDF based latex containing 25% solids, using Pro Scientific Inc. Pro300P homogenizer using a 30 mm×150 mm open slotted PRO generator probe with a Mason jar attachment loaded with sample volumes of 150 ml, at 25° C. It is noted that while many fluoropolymers are available as a stable latex, they shear-coagulate at high shear rates—due in part to larger particle size.

Fluoropolymer

The fluoropolymers useful in the invention include homopolymers and copolymers having greater than 50 weight percent of fluoromonomer units by weight, preferably more than 65 weight percent, more preferably greater than 75 weight percent and most preferably grater than 90 weight percent of one or more fluoromonomers. Especially useful fluoromonomers for forming the fluoropolymer include but are not limited to: vinylidene fluoride (VDF or $VF_2$), tetrafluoroethylene (TFE), trifluoroethylene (TrFE), chlorotrifluoroethylene (CTFE), hexafluoropropene (HFP), vinyl fluoride (VF), hexafluoroisobutylene (HFIB), perfluorobutylethylene (PFBE), pentafluoropropene, 3,3,3-trifluoro-1-propene, 2-trifluoromethyl-3,3,3-trifluoropropene, fluorinated vinyl ethers including perfluoromethyl ether (PMVE), perfluoroethylvinyl ether (PEVE), perfluoropropylvinyl ether (PPVE), perfluorobutylvinyl ether (PBVE), longer chain perfluorinated vinyl ethers, fluorinated dioxoles, partially- or per-fluorinated alpha olefins of $C_4$ and higher, partially- or per-fluorinated cyclic alkenes of $C_3$ and higher, and combinations thereof.

The fluoropolymers useful in the coating composition of the invention are thermoplastics. Thermoset fluoropolymers are excluded. The acrylic polymers in the coating composition may be thermoplastic or thermoset.

Preferred fluoropolymers include homo- or co-polymers of vinylidene fluoride (VDF), tetrafluoroethylene (TFE), and/or chlorotrifluoroethylene (CTFE)—with co-reactive monomers fluorinated or non-fluorinated such as hexafluoropropylene, perfluorovinyl ether, propane, vinyl acetate, and the like.

Especially preferred fluoropolymers are poly vinylidene fluoride (PVDF) homopolymers and copolymers. Vinylidene fluoride polymers will be used to illustrate the invention, and are the preferred polymer.

While non-fluorinated surfactants are preferred, the use of fluorosurfactants is also anticipated by this invention. PTFE polymers used in the coating of the invention must be fluorosurfactant free.

PTFE polymers are less preferred than PVDF polymers, because of their very high melting points, making the PTFE particles unable to soften and flow at lower processing temperatures. Further, due to PTFE's high fusion temperature, converting a PTFE dispersion to a sintered PTFE film requires a temperature of about 200° C. to dry the film, then temperatures as high as 400° C. for sintering, to obtain a clear coherent film.

PVDF

The term "vinylidene fluoride polymer" (PVDF) used herein includes both normally high molecular weight homopolymers, copolymers, and terpolymers within its meaning. Such copolymers include those containing at least 50 mole percent, preferably at least 75 mole %, more preferably at least 80 mole %, and even more preferably at least 85 mole % of vinylidene fluoride copolymerized with at least one comonomer selected from the group of fluoromonomers listed above. Particularly preferred are copolymers composed of from at least about 70 and up to 99 mole percent vinylidene fluoride, and correspondingly from 1 to 30 percent tetrafluoroethylene, such as the copolymer composition disclosed in British Patent No. 827,308; and about 70 to 99 percent vinylidene fluoride and 1 to 30 percent hexafluoropropene (see for example U.S. Pat. No. 3,178,399); and about 70 to 99 mole percent vinylidene fluoride and 1 to 30 mole percent trifluoroethylene. Terpolymers of vinylidene fluoride, hexafluoropropene and tetrafluoroethylene such as the copolymer composition described in U.S. Pat. No. 2,968,649 and terpolymers of vinylidene fluoride, trifluoroethylene and tetrafluoroethylene are also representatives of the class of vinylidene fluoride copolymers, which can be prepared by the process embodied herein.

In one embodiment, up to 30%, and preferably up to 15%, by weight of hexafluoropropene (HFP) units and 70%, preferably 85%, by weight or more of VDF units are present in the vinylidene fluoride polymer. It is desired that the HFP units be distributed as homogeneously as possible to provide PVDF-HFP copolymer with excellent dimensional stability in an end-use environment.

The PVDF for use in the coating composition preferably has a high molecular weight. By high molecular weight, as used herein is meant PVDF having a melt viscosity of greater than 1.0 kilopoise, preferably greater than 5 kilopoise, more preferably greater than 10 kilopoise and most preferably greater than 20 kilopoise, and even greater than 23 kilopoise, according to ASTM method D-3835 measured at 450° F. and 100 sec$^{-1}$.

The PVDF used in the invention is generally prepared by polymerizing means known in the art, using aqueous free-radical emulsion polymerization—although suspension, solution and supercritical $CO_2$ polymerization processes may also be used. In a general emulsion polymerization process, a reactor is charged with deionized water, water-soluble surfactant capable of emulsifying the reactant mass during polymerization and optional paraffin wax antifoulant. The mixture is stirred and deoxygenated. A predetermined amount of chain transfer agent, CTA, is then introduced into the reactor, the reactor temperature raised to the desired level and vinylidene fluoride (and possibly one or more comonomers) are fed into the reactor. Once the initial charge of vinylidene fluoride is introduced and the pressure in the reactor has reached the desired level, an initiator emulsion or solution is introduced to start the polymerization reaction. The temperature of the reaction can vary depending on the characteristics of the initiator used and one of skill in the art will know how to do so. Typically the temperature will be from about 30° to 150° C., preferably from about 60° to 110° C. Once the desired amount of polymer has been reached in the reactor, the monomer feed will be stopped, but initiator feed is optionally continued to consume residual monomer. Residual gases (containing unreacted monomers) are vented and the latex recovered from the reactor.

The surfactant used in the polymerization can be any surfactant known in the art to be useful in PVDF emulsion polymerization, including perfluorinated, partially fluorinated, and non-fluorinated surfactants. Preferably, for regulatory reasons, the PVDF emulsion of the invention is made without fluorinated surfactants. Non-fluorinated surfactants useful in the PVDF polymerization could be both ionic and non-ionic in nature including, but are not limited to, 3-allyloxy-2-hydroxy-1-propane sulfonic acid salt, polyvinylphosphonic acid, polyacrylic acids, polyvinyl sulfonic acid, and salts thereof, polyethylene glycol and/or polypropylene glycol and the block copolymers thereof, alkyl phosphonates and siloxane-based surfactants.

The PVDF polymerization results in a latex generally having a solids level of 10 to 60 percent by weight, preferably 10 to 50 percent, and having a volume average particle size of between 5 and 240 nm, preferably less than 240 nm, preferably less than 200 nm, preferably less than 175 nm, more preferably less than 150 nm, and more preferably less than 125 nm as measured by light scattering. Higher solids are preferred, as being more useful in a coating composition. The higher solids can be obtained by concentrating the polymer latex. The coating composition of the invention contains 0.2 to 150 parts by weight of PVDF polymer binder particles per 100 parts of water, preferably 10 to 50 parts by weight. A minor amount of one or more other water-miscible solvents, such as ethylene glycol, may be mixed into the PVDF latex to improve freeze-thaw stability.

In the present invention, PVDF polymer binder is generally used in the aqueous coating composition, however a blend of several different polymer binders, preferably all fluoropolymer binders, and most preferably all PVDF binders (two or more different homopolymers, copolymers or a mixture), may also be used. In one embodiment, only thermoplastic fluoropolymers that can be softened are used as the polymeric binder.

Acrylic Emulsion

The composition of the invention 1 to 40 parts, more preferably 5 to 30 parts of one or more acrylic polymer emulsions per 100 parts of water. The acrylic latex aids in the adhesion of the coating to metals and other substrates, and also adds to the good appearance of the coating. The nature of conventional PVDF dispersion paints is a mixture of discrete PVDF particles into a homogeneous acrylic solution phase or discrete PVDF particles and discrete acrylic particles in a non aqueous phase. These systems may or may not contain pigments and other additives as well. It is known in the art that in order to develop optimum properties from this type of paint system, the PVDF and acrylic phases must nix during film formation.

It has been found that the choice of the acrylic polymer, and the surfactant used in the emulsion polymerization are key components in the performance of the final coating or film formed.

"Acrylic polymer", as used herein, includes polymers, copolymers and terpolymers formed from alkyl methacrylate and alkyl acrylate monomers, and mixtures thereof. The alkyl methacrylate monomer is preferably methyl methacrylate, which may make up from 50 to 100 percent of the monomer mixture. 0 to 50 percent of other acrylate and methacrylate monomers or other ethylenically unsaturated monomers, included but not limited to, styrene, alpha methyl styrene, acrylonitrile, and crosslinkers may also be present in the monomer mixture. Other methacrylate and acrylate monomers useful in the monomer mixture include, but are not limited to, methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, hydroxymethyl acrylate and methacrylate, hydroxyethyl acrylate and methacrylate, dimethylamino ethyl acrylate and methacrylate monomers. Alkyl (meth) acrylic acids such as methyl acrylic acid and acrylic acid, and hydroxyethyl ethylene urea methacrylate (HEEUMA) were found to be useful for the monomer mixture to improve wet adhesion of the final coating. In one embodiment of the invention, the volume average particle size of the acrylic emulsion is less than 300 nm, preferably less than 250 nm, and more preferably less than 200 nm.

In a preferred embodiment, the acrylic latex polymer is formed from 75-97 weight percent of methyl methacrylate monomer units, and 3 to 25 weight percent of one or more $C_{1-6}$ alkyl acrylate monomer units.

The acrylic polymer in the present invention is preferably a copolymer of acrylate monomers, such as a mixture of butyl acrylate, ethyl acrylate, and methyl methacrylate, and a wet adhesion monomer such as hydroxyethyl ethylene urea methacrylate (HEEUMA), and (methyl)acrylic acid in the examples. The amount of wet adhesion monomer used from 0.2% to 15 weight percent, and preferably from 0.5 to 10 weight percent to achieve good adhesion property.

The acrylic emulsion polymer is formed by conventional emulsion polymerization and can be a batch, semi-continuous or a continuous polymerizaation process. The surfactant used in the polymerization process can be typical anionic, cationic, and nonionic emulsifiers used in emulsion polymerization, or a mixture of different types. In a preferred embodiment, an anionic surfactant is used in the polymerization. In another embodiment, use of both an anionic and a non-ionic surfactant is used as the surfactant system. Representative anionic emulsifiers include, but are not limited to, alkyl aryl sulfonates, alkali metal alkyl sulfates, the sulfonated alkyl esters, and fatty acid soaps. Preferred emulsifiers include sodium dodecylbenzene sulfonate, sodium butylnaphthalene sulfonate, disodium dodecyl diphenyl ether disulfonate. Reactive surfactants can also be used in the reaction, such as sodium alpha-olefin sulfonate. These emulsifiers may be used alone or in combination. The amount of emulsifying agents used is in the range of from 0.1 wt % (based on total monomer weight) to 5 wt % based on the type of emulsifier. The preferred amount is under 2 wt %.

In a preferred embodiment, sodium dodecylbenzene sulfonate and CALSOFT AOS-40 sodium alpha-olefin sulfonate (CAS#=68439-57-6) were found especially useful for reducing yellowing in a high bake coating process. On the other hand, surfactants containing oxyalkylene groups (—R—O—) such as oxyethylene and/or oxypropylene groups are good for wet adhesion but are less useful for reduced color formation in high baking condition.

In order to control film yellowing, chasers (initiators) are applied to the end of the reaction to control the residual monomer under 500 ppm, and preferably under 300 ppm.

It was discovered that the control in molecular weight of the acrylic polymer improved wet adhesion of PVDF water-based coatings to the substrates. Preferably, the average molecular weight (as measured by DSC) of acrylic polymer is in the range of from 50,000 to 1,000,000 for the best adhesion property, especially for wet adhesion to substrates, and chemical resistance. Preferably the average molecular weight is in the range of from 100,000 to 500,000 g/mol. The solids content of acrylic latex is preferably above 25 wt %, and more preferably greater than 35 wt % for good PVDF water based film properties.

The acrylic polymer is present in the coating composition at from 1 to 40 parts, based on 100 parts of water, and the fluropolymer is present at from 0.2 to 150 parts. The ratio of acrylic polymer to fluoropolymer useful in the invention can be anything within this range. In a preferred embodiment, the parts of fluropolymer is higher than the parts of acrylic polymer.

The acrylic polymer is preferably a thermoplastic, though it can be a thermoset polymer—or a mixture of the two.

Surfactant/Anti-Settling Agent

The composition of the invention contains 0 to 50 parts, preferably from 0.1 to 10 parts, and more preferably 0.5 to 5 parts of one or more additional anti-settling agents and/or surfactants per 100 parts of water. These anti-settling agents or surfactants are added to the PVDF dispersion post-polymerization, generally to improve the shelf stability, and provide additional stabilization during slurry preparation. Also during the polymerization process, the surfactant/anti-settling agent used in this invention could be added all upfront prior to polymerization, fed continuously during the polymerization, fed partly before and then during polymerization, fed after polymerization started and progressed for a while.

Useful anti-settling agents include, but are not limited to, ionic substances, such as salts of alkyl sulfates, sulfonates, phosphates, phophonates (such as sodium lauryl sulfate and ammonium lauryl sulfate) and salts of partially fluorinated alkyl sulfates, carboxylates, phosphates, phosphonates (such as the CAPSTONE from DuPont), and non-ionic surfactants such as the TRITON X series (from Dow) and PLURONIC series (from BASF). The LEOCOL family of surfactants from Lion Corporation are also useful as anti-settling agents. In one embodiment, only anionic surfactants are used. It is preferred that no fluorinated surfactants are present in the composition, either residual surfactant from a polymerization process, or added post-polymerization in forming or concentrating an aqueous dispersion.

Wetting Agent

The composition of the invention optionally contains 0 to 50 parts, preferably from 0.1 to 10 parts, and more preferably 0.5 to 5 parts of one or more wetting agents per 100 parts of water. Surfactants can serve as wetting agents, but wetting agents may also include non-surfactants. In some embodiments, the wetting agent can be an organic solvent. It has been found that the presence of optional wetting agents permits uniform dispersion of powdery pigment materials into aqueous dispersion of vinylidene fluoride polymer. Some wetting agents (e.g. BYK 346 from BYK Chemie) also help to reduce surface tension of substrates, resulting in good substrate wetting. Useful wetting agents include, but are not limited to, ionic and non-ionic surfactants such as the TRITON series (from Dow), the PLURONIC series (from BASF), silicone surfactant such as BYK series, the LEOCOL family of surfactants from Lion Corporation, and organic liquids that are compatible with the aqueous dispersion, including but not limited to NMP, DMSO, acetone.

Thickener

The composition of the invention may 0 to 50 parts, preferably from 0.1 to 10 parts, and more preferably 0.5 to 5 parts of one or more thickeners or rheology modifiers per 100 parts of water. Addition of water-soluble thickener or rheology modifier to the above dispersion prevents or slows down the settling of coating materials while providing appropriate slurry viscosity for a casting process. Useful thickeners include, but are not limited to the ACRYSOL series (from Dow Chemicals); partially neutralized poly (acrylic acid) or poly(methacrylic acid) such as CARBOPOL from Lubrizol; and carboxylated alkyl cellulose, such as carboxylated methyl cellulose (CMC). Adjustment of the formulation pH can improve the effectiveness of some of the thickeners. In addition to organic rheology modifiers, inorganic rheology modifiers can also be used alone or in combination. Useful inorganic rheology modifiers include, but are not limited to, inorganic rheology modifiers including but not limited to natural clays such as montmorillonite and bentonite, manmade clays such as laponite, and others such as silica, and talc.

Coalescent Agents

A coalescent agent is required to produce a good film. By "coalescent agent" as used herein is meant solvents (usually glycol ethers) that help in the film formation of finish. These solvents evaporate during the drying process. The coating contains 0 to 150 parts, preferably 1 to 100 parts, and more preferably from 2 to 30 parts, of one or more coalescent agents per 100 parts of water. Preferably the coalescing agent is an organic liquid, that is soluble or miscible in water. This organic liquid acts as a plasticizer for PVDF particles, making them tacky and capable of forming a continuous film during the drying step. The PVDF polymer particles are able to soften, flow and adhere to substrates during manufacture, resulting in a crack free film. In one embodiment the organic liquid is a latent solvent, which is a solvent that does not dissolve or substantially swell PVDF resin at room temperature, but will solvate the PVDF resin at elevated temperatures. In one embodiment a useful organic solvent is N-methyl-2-pyrrolidone. Other useful coalescent agents include, but are not limited to, dimethylformamide, N,N-dimethylacetamide, dimethylsulfoxide (DMSO), hexamethylphosphamide, dioxane, tetrahydrofuran, tetramethylurea, triethyl phosphate, trimethyl phosphate, dimethyl succinate, diethyl succinate and tetraethyl urea. Preferred coalescing agents include dipropylene glycol n-butyl ether, tripropylene glycol methyl ether, triethyl phosphate, and n-methylpyrrolidone Pigments The paint base or paint vehicle composition may be left un-pigmented to form a varnish, or it may be mixed with one or more pigments to form a paint. The same pigments useful in other PVDF based coatings may satisfactorily be used in the practice of the present invention. The pigments include, for example, those pigments identified in U.S. Pat. No. 3,340,222. The pigment may be organic or inorganic. According to one embodiment, the pigment may comprise titanium dioxide, or titanium dioxide in combination with one or more other inorganic pigments wherein titanium dioxide comprises the major part of the combination. Inorganic pigments which may be used alone or in combination with titanium dioxide include, for example, silica, iron oxides of various colors, cadmiums, lead titanate, and various silicates, for example, talc, diatomaceous earth, asbestos, mica, clay, and basic lead silicate. Pigments which may be used in combination with titanium dioxide include, for example, zinc oxide, zinc sulfide, zirconium oxide, white lead, carbon black, lead chromate, leafing and non-leafing metallic pigments, molybdate orange, calcium carbonate and barium sulfate.

The preferred pigment category is the ceramic metal oxide type pigments which are calcined. Chromium oxides and some iron oxides of the calcined type may also be satisfactorily utilized. For applications where a white coating is desired, a non-chalking, non-yellowing rutile-type of titanium dioxide is recommended. Lithopones and the like are inadequate, as they suffer from lack of chalk resistance and/or from inadequate hiding. Anastase $TiO_2$ is similarly not recommended.

The pigment component, when present, is advantageously present in the composition in the amount of from about 0.1 to about 50 parts by weight per 100 parts of polymer solids (fluoropolymer plus acrylic polymer). While for most applications the preferred range is from about 25 to about 35 parts by weight pigment per 100 parts of resin component, for white and light colored pigment the amount of pigment is generally in the higher ranges of the preferred amount, and may be as high as 35 parts by weight per 100 parts of resin component or higher. Solid, non-porous coatings will have a lower percentage of pigment to polymer, while porous coatings may have higher ratios of pigment to polymer binders.

Other Additives

The coating composition of the invention may further contain effective amounts of other additives, including but not limited to fillers, leveling agents, anti-foaming agents, pH buffers, neutralizing agents and other adjuvants typically used in waterborne formulation while meeting desired coating requirements. Suitable neutralizing agents include inorganic and organic bases such as sodium hydroxide, potassium hydroxide, ammonia, amines, alcohol amines having at least one primary, secondary, or tertiary amino group and at least one hydroxyl group. Suitable amines include alkanolamines such as monoethanolamine, diethanolamine, dimethylaminoethanol, diisopropanolamine, and the like, as well as alkylamines, such as dibutylamine, triethylamine, and the like.

Aqueous Coating Composition

The aqueous coating composition of the invention can be obtained in many different ways. In one embodiment, a PVDF dispersion is formed (preferably without any fluorosurfactant) and a predetermined amount of any anti-settling agent(s) or surfactant(s), is diluted in water and post-added to the PVDF dispersion latex with stirring, in order to provide adequate storage stability for the latex. To this PVDF dispersion/anti-settling mixture is added, with stirring, the acrylic emulsion, wetting agent(s), coalescent agents, followed by adding any thickener(s), adhesion promoter(s), and then bringing the pH up to the appropriate range for the thickener to be effective, if necessary. Some thickeners such as CMC are effective in a wide range of pH, i.e. from 3 to 9 pH for CMC. Other ingredients such as pigment aqueous dispersions are then added to the mixture. It may be advantageous to disperse the pigment powdery material(s) in water or wetting agent to provide wetting of the powdery materials prior to admixing with the aqueous PVDF binder formulation. The final composition is then subjected to a high shear mixing to ensure uniform distribution of the powdery material in the composition. The final aqueous composition of the invention should have a viscosity useful for casting or coating onto a substrate. The useful viscosity is in the range of from 2,000 to 20,000 cps at 20 rpm, at 25° C. depending on application methods.

The coating compositions of the invention may be applied to a wide variety of substrates including metals, ceramics, glass and the like by conventional coating methods, such as spraying, brushing, dipping, casting, knife coating, coil coating, reverse roll coating, draw down and other methods known in the art.

The coating of the invention provides a crack-resistant, highly-weatherable, chemical resistant, dirt-shedding protective coating to many types of articles, including but not limited to pipe, architectural structures, metal window frames, metal sheets and coils, fiberglass fabrics, textiles, ceramics, marble, glass, china, and brick. One of skill in the art, based on the description and examples provided, can imagine many other uses in which the aqueous coating of the invention could be used advantageously.

After application, the coating compositions are generally baked or heated to evaporate water and solvent, and coalesce the coating. The heating temperatures will range from about 125° to about 300° C., preferably from about 175° to about 220° C. Although adherence of the polymer film formed on drying the coating compositions to the substrate is normally more than adequate, increased adhesion may be obtained by first priming the substrate surface with a compatible coating layer. For metal coatings, a preferred primer layer is described in U.S. Pat. No. 3,111,426 that is an epoxy based primer. More generally, acrylic based primers such as described in U.S. Pat. No. 3,526,532 and the primers of U.S. Pat. No. 4,179,542 based on mixtures of partially fluorinated halogenated ethylene polymers, epoxy resins, powdered metallic pigments and wet ground mica are also useful on metals. For coatings on glass, as well as glass cloth, glass fibers or other flexible substrates, woven or non-woven, known adhesion promoters may be used. In particular, glass fiber may first be treated with a silane coupling agent as described by I. L. Fan and R. G. Shaw, Rubber World, June 1971, page 56.

Alternatively, the paints and varnishes of the invention may be cast and subjected to heating to obtain a free film of the composition. In all cases, the final coatings are smooth, glossy, uniform and adhere tenaciously to the substrate. The films and coatings are also hard, creep resistant (that is dimensionally stable), flexible, chemically resistant and weather resistant. Smoke generation resistance and hydrophobicity are also provided by the films and coatings.

The coatings of the present invention provide a coating or film that has been found to resist yellowing under high temperature bake conditions. It was also found that coatings and films containing polyethylene oxide (PEO) can became yellow under high temperature bake conditions.

The aqueous coating composition of the invention has an advantage in processing, in that water has a boiling point lower than the commonly used solvents for PVDF, and thus can be dried faster, or at a lower temperature than solvent PVDF compositions, and lower than compositions containing PTFE. Process temperatures of 200° C. or less, 150° C. or less, 120° C. or less, and result in a crack free continuous film.

Another advantage of using the aqueous coating of the present invention over the solvent coatings of the art, is that an aqueous PVDF dispersion gives a higher gloss coating. Compared with the fluoropolymer/acrylic hybrid aqueous compositions described in U.S. Pat. No. 5,804,650 and US2011/0118403, a better chemical resistance and dirt pick up resistance were observed from the aqueous coating composition of the present invention.

The composition of the acrylic polymer further provides excellent long-term stability of the PVDF/acrylic mixture.

The coating compositions of the invention may also be used for impregnation of textiles, and natural and synthetic fibers including but not limited to polyamides, such as polyamide 6 (PA-6), polyamide 11 (PA-11), polyamide 12 (PA-12), polyamide 6,6 (PA-6,6), polyamide 4,6 (PA-4,6), polyamide 6,10 (PA-6,10) or polyamide 6,12 (PA-6,12); polyamide/polyether block copolymer (Pebax®); high-density polyethylene; polypropylene; polyester; carbon fibers; glass fibers, in particular E, R or S2 glass fibers; aramid (Kevlar) fibers; boron fibers; silica fibers; natural fibers such as flax, hemp or sisal; and mixtures thereof, such as mixtures of glass, carbon and aramid fibers. The fibers may be used as they are, in the form of unidirectional threads, or after a weaving step, in the form of a fabric made up of a bidirectional network of fibers.

The coating composition may be applied to the fibers or fabric by means known in the art, including but not limited to passing them through an impregnating bath, spraying, brushing, ink jet, roller, dipping, casting, gravure, and curtain coating. Alternatively, a thin film formed of the polymer coating (50 to 200 micron) can be first formed, then laminated tone or both sides of a fabric, or placed between two layers of fabric and laminated.

One use of the coated fabric is for architectural structures—awnings, tents, and domes. Currently PTFE is used to coat fabrics, to provide a weather-resistant, flexible material. PVDF coatings can be formed at much lower temperatures than PTFE coatings. Also, since PVDF is less dense than PTFE, the resulting structure having the same coating thickness will be lighter and easier to support.

EXAMPLES

Examples A

Into an 80-gallon stainless steel reactor was charged, 345 lbs of deionized water, 250 grams of PLURONIC 31R1 (non-fluorinated non-ionic surfactant from BASF), and 0.3 lbs of propane. Following evacuation, agitation was begun at 23 rpm and the reactor was heated. After the reactor temperature reached the desired set point of 100° C., the vinylidene fluoride (VDF) charge was started. Reactor pressure was then raised to 650 psi by charging approximately 35 lbs VDF into the reactor. After reactor pressure was stabilized, 4.5 lbs of initiator solution made of 1.0 wt % potassium persulfate and 1.0 wt % sodium acetate was added to the reactor to initiate polymerization. The rate of further addition of the initiator solution was adjusted to obtain and maintain a final VDF polymerization rate of roughly 70 pounds per hour. The VDF homopolymerization was continued until approximately 150 pounds VDF was introduced in the reaction mass. The VDF feed was stopped and the batch was allowed to react-out at the reaction temperature to consume residual monomer at decreasing pressure. After 25 minutes, the agitation was stopped and the reactor was cooled, vented and the latex recovered. Solids in the recovered latex were determined by gravimetric technique and were about 27 weight % and melt viscosity of about 27 kp according to ASTM method D-3835 measured at 450° F. and 100 sec$^{-1}$. The melting temperature of the resin was measured in accordance with ASTM method D-3418 and was found to be about 162° C. The weight average particle size was measured by NICOMP laser light scattering instrument and was found to be about 150 nm.

Examples B

Into an 80-gallon stainless steel reactor was charged: 345 lbs of deionized water, 250 grams of PLURONIC 31R1 (non-fluorinated non-ionic surfactant from BASF), and 0.6 lbs of ethyl acetate. Following evacuation, agitation was begun at 23 rpm and the reactor was heated. After the reactor temperature reached the desired set point of 100° C., the VDF and HFP monomer were introduced to reactor with a HFP ratio of 40 wt % of total monomers. Reactor pressure was then raised to 650 psi by charging approximately 35 lbs total monomers into the reactor. After reactor pressure was stabilized, 5.0 lbs of initiator solution made of 1.0 wt % potassium persulfate and 1.0 wt % sodium acetate were added to the reactor to initiate polymerization. Upon initiation, the ratio of HFP to VDF was so adjusted to arrive at 16.5% HFP to total monomers in the feed. The rate of further addition of the initiator solution was also adjusted to obtain and maintain a final combined VDF and HFP polymerization rate of roughly 70 pounds per hour. The VDF and HPF copolymerization was continued until approximately 160 pounds monomers were introduced in the reaction mass. The HFP feed was stopped but VDF feed continued till approximately 180 lbs of total monomers were fed to the reactor. The VDF feed was stopped and the batch was allowed to react-out at the reaction temperature to consume residual monomer at decreasing pressure. After 40 minutes, the initiator feed and agitation were stopped and the reactor was cooled, vented and the latex recovered. Solids in the recovered latex were determined by gravimetric technique and were about 32 weight % and melt viscosity of about 28 kp according to ASTM method D-3835 measured at 450° F. and 100 sec$^{-1}$. The melting temperature of resin was measured in accordance with ASTMD3418 and was found to be about 120° C. The weight average particle size was measured by NICOMP laser light scattering instrument and was found to be about 160 nm.

Example C

Into an 80-gallon stainless steel reactor was charged, 345 lbs of deionized water, 250 grams of PLURONIC 31R1 (non-fluorinated non-ionic surfactant from BASF), and 0.35 lbs of ethyl acetate. Following evacuation, agitation was begun at 23 rpm and the reactor was heated. After the reactor temperature reached the desired set point of 100° C., the VDF and HFP monomer were introduced to reactor with HFP ratio of 13.2 wt % of total monomers. Reactor pressure was then raised to 650 psi by charging approximately 35 lbs total monomers into the reactor. After reactor pressure was stabilized, 3.5 lbs of initiator solution made of 1.0 wt % potassium persulfate and 1.0 wt % sodium acetate were added to the reactor to initiate polymerization. Upon initiation, the ratio of HFP to VDF was so adjusted to arrive at 4.4% HFP to total monomers in the feed. The rate of further addition of the initiator solution was also adjusted to obtain and maintain a final combined VDF and HFP polymerization rate of roughly 90 pounds per hour. The VDF and HPF copolymerization was continued until approximately 160 pounds monomers were introduced in the reaction mass. The HFP feed was stopped but VDF feed continued till approximately 180 lbs of total monomers were fed to the reactor. The VDF feed was stopped and the batch was allowed to react-out at the reaction temperature to consume residual monomer at decreasing pressure. After 40 minutes, the initiator feed and agitation were stopped and the reactor was cooled, vented and the latex recovered. Solids in the recovered latex were determined by gravimetric technique and were about 32 weight % and melt viscosity of about 38 kp according to ASTM method D-3835 measured at 450° F. and 100 sec$^{-1}$. The melting temperature of the resin was measured in accordance with ASTM method D-3418 and was found to be about 152° C. The weight average particle size was measured by NICOMP laser light scattering instrument and was found to be about 160 nm.

The above PVDF based latexes were then formulated into an aqueous coating composition and applied to a substrate and dried.

The following examples further illustrate the best mode contemplated by the inventors for the practice of their invention and should be considered as illustrative and not in limitation thereof.

Raw Materials:

Polyvinylidene fluoride-acrylic hybrid latex, available from Arkema Inc. as Kynar Aquatec® ARC as described in U.S. Pat. No. 5,804,650 and US2011/0118403; solid content 45 wt percent. PVDF/acrylic ratio is 70/30.

PVDF latex 32: classic polyvinylidene fluoride latex with an average volume particle size of 300-350 nm, available from Arkema Inc.; solid content 25 wt percent.

Example latexes A, B and C: small particle size polyvinylidene fluoride latex with average volume particle size less than 250 nm, available from Arkema Inc.; solid content 25 wt percent.

KYNAR 500 Plus: PVDF powder of SPS PVDF emulsion, used for making solvent based dispersion coatings; available from Arkema Inc.;

RHOPLEX B88 latex: PMMA-EA acrylic emulsion, available from Dow Chemicals; solid content 38 wt percent PARALOID B44: PMMA-EA acrylic pellets, available from Dow Chemicals; used to formulate solvent based coatings.

Test Methods:

Each of the coating compositions was prepared by combining the ingredients listed in Table 1. Each of the compositions were then cast on chromated aluminum AA3003 panels (4"×12"). The coated panels were cured by baking for 10 minutes at 220° C. followed air cooled (the comparative example 2 was baked at 120° C. for 10 minutes though as a phase separation will occur at high temperature baking. 120° C. is the highest temperature that this latex product can stand). The coatings were then evaluated for film appearance, adhesion, gloss, MEK resistance and hot dirt pick up resistance.

The adhesion was evaluated using ASTM D3359 crosshatch method by applying and removing pressure-sensitive tape over cuts made in the film. Each panel was crosshatched with a PAT crosshatcher. Eleven parallel cuts were made one-tenth of an inch apart followed by parallel cuts one-tenth of an inch apart, perpendicular to and on top of the first set. The crosshatched area was then tested for pick-off of the coating using #99 PERMACEL Tape. The adhesion was reported with the number of squares remaining in the scribed area. The higher the number, the better the adhesion was. For example, 100% means no pick-off of coating and 0% means all film was picked off.

The gloss was read using a HunterLab ProGloss 3 (Geometry 60°). For the hot dirt pick up resistance test, aqueous slurry of iron oxide pigment was applied over the coating surface and allowed to dry 2 hrs at 70° C. followed by 2 hrs cooling at room temperature. The dry iron oxide was then rinsed off of the paint with water and light wiping with a piece of wet cheesecloth. The panels were cleaned until no more iron oxide was being picked up by the cheesecloth, then the color difference (Delta E) was read between the area coated with the iron oxide slurry and a control area with no iron oxide slurry. In this test, larger Delta E numbers indicate that more iron oxide pigment is left on the surface of the paint.

MEK resistance test was determined according to ASTM D4752 and NCCA Technical Bulletin 4.2.11 Test Method—For Evaluation of Solvent Resistance By Solvent Rub. The method involves rubbing the surface of a baked film with cheesecloth soaked with MEK until failure or breakthrough of the film occurs. The MEK resistance is characterized with the number of Taber cycles required for the coating to wear away to the substrate. The higher the number is, the better the MEK resistance the coating has.

The invention is demonstrated with working example 1 and comparative examples 2-4 as listed Table 1. The comparative example 1 is an aqueous composition which is formulated with classic PVDF latex having an average particle size larger than 250 nm. The comparative example 2 is an aqueous composition formulated with Kynar Aquatec ARC, a PVDF/acrylic hybrid latex. The comparative example 3 is a solvent based PVDF dispersion coating. All the four formulations have the same PVDF and acrylic ratio of 70:30.

The stable aqueous fluoropolymer coating composition as shown in the working example 1 provides coatings with higher gloss levels than conventional solvent based PVDF/acrylic blended paint systems as shown in the comparative example 3. The film formation of the aqueous coating of the present invention where the particle size of fluoropolymer emulsion is less than 200 nm is much better than the aqueous coating of classical PVDF emulsions having particle size over than 250 nm as shown in the comparative example 1 where the film is cracked. In addition, the MEK chemical resistance and hot dirt pick up resistance of the aqueous coatings in the working example are improved over the hybrid systems under certain formulation and baking conditions as shown in the comparative example 2.

TABLE 1

Coating formulation of working and comparative examples

| Working Example 1 | grams |
| --- | --- |
| Example A, emulsion, 25 wt % | 88.9 |
| Rhoplex B88 emulsion, 38 wt % | 22.9 |
| Tripropylene Glycol (Mono) Methyl Ether | 5.1 |
| Triethyl Phosphate | 5.1 |
| N-methyl-2-pyrrolidone | 5.1 |
| RM-8W (18%) | 15.2 |
| BYK346 | 0.9 |
| Triton X-100 (10%) | 6.9 |
| Ammonia, 7% | 0.5 |
| Total | 150.5 |
| Water (g) in final formulation | 100.0 |
| PVDF/Acrylic | 70/30 |

| Comparative Example 1 | grams |
| --- | --- |
| PVDF Latex 32, emulsion, 25 wt % | 88.9 |
| Rhop lex B88 emulsion, 38 wt % | 22.9 |
| Tripropylene Glycol (Mono) Methyl Ether | 5.1 |
| Triethyl Phosphate | 5.1 |
| N-methyl-2-pyrrolidone | 5.1 |
| RM-8W (18%) | 15.2 |
| BYK346 | 0.9 |
| Triton X-100 (10%) | 6.9 |
| Ammonia, 7% | 0.5 |
| Total | 150.5 |
| Water (g) in final formulation | 100.0 |
| PVDF/Acrylic | 70/30 |

| Comparative Example 2 | grams |
| --- | --- |
| Kynar Aquatec ARC emulsion, 45 wt % | 68.6 |
| Dipropylene Glycol (Mono) Methyl Ether | 10.2 |
| N-methyl-2-pyrrolidone | 5.1 |
| RM-8W (18%) | 15.2 |
| BYK346 | 0.9 |
| Triton X-100 (10%) | 6.9 |
| Ammonia, 7% | 0.5 |
| water | 43.2 |

TABLE 1-continued

Coating formulation of working and comparative examples

| Total | 150.5 |
| --- | --- |
| Water (g) in final formulation | 100.0 |
| PVDF/Acrylic | 70/30 |

| Comparative Example 3 | grams |
| --- | --- |
| KYNAR 500 Plus, Powder | 8.8 |
| PARALOID B44, pellet | 3.8 |
| Isophorone | 9.7 |
| Toluene | 5.7 |
| Total | 28.0 |
| PVDF/Acrylic | 70/30 |

TABLE 2

Coating Comparison Results

| | Working | Comparative Examples | | |
| --- | --- | --- | --- | --- |
| | Example 1 | 1 | 2 | 3 |
| Film Formation | smooth crack free frilm | crack | smooth crack free frilm | smooth crack free frilm |
| X-hatch Adhesion | 100% | 0% | 100% | 100% |
| MEK Resistance | >200 | 0 | 10 | >200 |
| Hot Dirt Pick Up Resistance at 70 C., Delta E | 0.8 | NA | 9.6 | 0.7 |
| Gloss, 60 Degree | 84 | 0 | 64 | 45 |

Shear Stability of Latex

Latexes A, B, and C were diluted to 25% solids, and subjected to shear at 2000 and 4000 rpm (revolution per minutes) using Pro Scientific Inc. Pro300P homogenizer using a 30 mm×150 mm open slotted PRO generator probe with Mason jar attachment loaded with sample volumes of 150 ml, at room temperature (25° C.). Blue food dye was used to aid determination of the coagulation point. The following Table 3 shows time to on-set of coagulation.

TABLE 3

| | on-set of coagulation at 2000 rpm (min) | on-set of coagulation at 4000 rpm (min) |
| --- | --- | --- |
| Latex A | 61 | 11 |
| Latex B | 120 | 20 |
| latex C | 43 | 8 |

High shear stability is defined as time to on-set of coagulation to be greater than 20 min at 2000 rpm and/or greater than 4 min at 4000 rpm for PVDF based latex containing 25% solids.

Examples of Acrylic Emulsion (A1 to A6):

Example A1 Emulsion

A 5 liter polymerization reactor equipped with a stirrer and a reflux condenser was charged with 794.4 g of distilled water, 18.62 g of sodium dodecylbenzene sulfonate, and 0.66 g of sodium carbonate. A monomer mixture of MMA/EA/Meio(Bimax HUEEUMA)/t-DDM/Calsoft AOS-40 in the weight ratio of 440.52 g/82.5 g/23.40 g/3.58 g/11 g was added to the reactor. The reaction temperature was set to 60° C. while the reactor was sparged with nitrogen for 20 minutes. After the sparge, 11 g 4% potassium persulfate solution and 13.2 g 5% sodium metabisulfite solution in distilled water were charged to the reactor under the nitrogen atmosphere, and the reaction was initiated at 65° C. The peak temperature of 98° C. was observed after 20 minutes. The reactor temperature was set to 80° C. with air cooling on and 0.69 g 4% potassium persulfate solution, 1.65 g 5% sodium metabisulfite solution, and 0.73 g 15% t-butyl hydroperoxide in distilled water were added to the reactor. The batch was hold for 60 minutes at 80° C. and then cooled to room temperature. The final latex particle size Dv was 86 nm, solid content was ~39%, and Mw was 305 509.

Example A2 Emulsion

A 5 liter polymerization reactor equipped with a stirrer and a reflux condenser was charged with 786.21 g of distilled water, 32.59 g of sodium dodecylbenzene sulfonate, and 0.66 g of sodium carbonate. A monomer mixture of MMA/EA/Meio(Bimax HuEEUMA)/t-DDM in the weight ratio of 440.52 g/82.5 g/23.40 g/3.58 g was added to the reactor. The reaction temperature was set to 62° C. while the reactor was sparged with nitrogen for 20 minutes. After the sparge, 13.75 g 4% potassium persulfate solution and 13.2 g 5% sodium metabisulfite solution in distilled water were charged to the reactor under the nitrogen atmosphere, and the reaction was initiated at 65° C. The peak temperature of 96.4° C. was observed after 17 minutes. The reactor temperature was set to 80° C. with air cooling on and 0.69 g 4% potassium persulfate solution, 1.65 g 5% sodium metabisulfite solution, and 0.73 g 15% t-butyl hydroperoxide in distilled water were added to the reactor. The batch was hold for 60 minutes at 80° C. and then cooled to room temperature. The final latex particle size Dv was 80 nm, solid content was ~39%, and Mw was 315 399.

Example A3 Emulsion

Same procedure as Example A2 Emulsion was followed to make Example A3 Emulsion. The only difference was the monomer mixture of MMA/EA/Meio(Norsocryl 104)/t-DDM in the weight ratio of 82/15/2/1 instead of 82.35/15/2/0.65 for the sample 1 in the Example 1. The final latex particle size Dv is 99 nm, solid content was ~40%, and Mw was 184 300.

Example A4 Emulsion 821.18 g preemulsion was prepared in the weight ratio of MMA/EA/Meio(Bimax HuEEUMA)/t-DDM/sodium dodecylbenzene sulfonate/distilled water 441.22/82.5/23.4/3.58/32.59/237.89. A 5 liter polymerization reactor equipped with a stirrer and a reflux condenser was charged with 340.11 g of distilled water, and 0.72 g of sodium carbonate. 492.1 g preemulsion was added to the reactor. The reaction temperature was set to 65° C. while the reactor was sparged with nitrogen for 20 minutes. After the sparge, the reaction was initiated at 65° C. by the addition of 8.25 g 4% potassium persulfate solution and 8.03 g 5% sodium metabisulfite solution in distilled water under the nitrogen atmosphere. The peak temperature of 90° C. was observed after 22 minutes. The reactor temperature was set to 68° C. with air cooling on, and hold for 30 minutes. 326.8 g preemulsion was charged into the reactor by the pump at 68° C. followed by the addition of 5.5 g 4% potassium persulfate solution and 5.35 g 5% sodium metabisulfite solution in distilled water. The peak temperature of 90° C. was observed after 11 minutes. 0.69 g 4% potassium persulfate solution, 1.65 g 5% sodium metabisulfite solution, and 0.73 g 15% t-butyl hydroperoxide in distilled water were added to the reactor after the peak temperature. The batch was hold for 60 minutes at 80° C. and then cooled to room temperature. The final latex particle size Dv was 103 nm, solid content was ~46.8%, and Mw was 346 480.

Example A5 Emulsion

A 5 liter polymerization reactor equipped with a stirrer and a reflux condenser was charged with 728.99 g of distilled water, 12.70 g of sodium dodecylbenzene sulfonate, and 0.48 g of sodium carbonate. A monomer mixture of MMA/EA/Meio(Norsocryl 104)/t-DDM/Bisomer SEM in the weight ratio of 401.75 g/75 g/20 g/3.25/15.38 g was added to the reactor. The reaction temperature was set to 60° C. while the reactor was sparged with nitrogen for 20 minutes. The reaction was initiated with the addition of 10 g 4% potassium persulfate solution and 6 g 5% sodium metabisulfite solution in distilled water under the nitrogen atmosphere. A peak temperature of 94.4° C. was observed after 26 minutes. The reactor temperature was set to 80° C. with air cooling on and 0.63 g 4% potassium persulfate solution, 1.5 g 5% sodium metabisulfite solution, and 0.67 g 15% t-butyl hydroperoxide in distilled water were added to the reactor. The batch was hold for 60 minutes at 80° C. and then cooled to room temperature. The final latex particle size Dv was 137 nm, solid content was ~40%, and Mw was 409 571.

Example A6 Emulsion

A 5 liter polymerization reactor equipped with a stirrer and a reflux condenser was charged with 802.67 g of distilled water, 11.81 g of sodium dodecylbenzene sulfonate, and 0.53 g of sodium carbonate. A monomer mixture of MMA/EA/MAA/t-DDM/Sipomer COPS I in the weight ratio of 452.93 g/82.5 g/11 g/3.58 g/13.75 was added to the reactor. The reaction temperature was set to 55° C. while the reactor was sparged with nitrogen for 20 minutes. The reaction was initiated with the addition of 11 g 4% potassium persulfate solution and 6.6 g 5% sodium metabisulfite solution in distilled water under the nitrogen atmosphere. A peak temperature of 94° C. was observed after 22 minutes. The reactor temperature was adjusted to 80° C. with air cooling on and 0.69 g 4% potassium persulfate solution, 1.65 g 5% sodium metabisulfite solution, and 0.73 g 15% t-butyl hydroperoxide in distilled water were added to the reactor. The batch was hold for 60 minutes at 80° C. and then cooled to room temperature. The final latex particle size Dv was 153 nm, solid content was ~40%.

The abbreviations listed below are used throughout the examples:
MMA=Methyl Methacrylate
EA=Ethyl Acrylate
t-DDM=Tert-Dodecyl Mercaptan
Meio=2-(2-OXOIMIDAZOLIDIN-1-YL)ETHYL METHACRYLATE
Norsocryl 102 from Arkema
HUEEUMA from Bimax

TABLE 4

| Formulations for working examples and comparative examples: | |
|---|---|
| Working Example 2 | grams |
| Example A, emulsion, 35 wt % | 79.1 |
| Example A1 emulsion, 39 wt % | 30.4 |
| Tripropylene Glycol (Mono) Methyl Ether | 5.1 |
| Triethyl Phosphate | 5.1 |

TABLE 4-continued

Formulations for working examples and comparative examples:

| | |
|---|---|
| N-methyl-2-pyrrolidone | 5.1 |
| RM-8W (18%) | 14.0 |
| BYK346 | 1.0 |
| Leocol TDN-90-80 (79%) | 6.9 |
| Ammonia, 7% | 0.5 |
| Total | 147.2 |
| Water (g) in final formulation | 99.7 |
| PVDF/Acrylic | 70/30 |

| Working Example 3 | grams |
|---|---|
| Example A, emulsion, 35 wt % | 79.1 |
| Example A2 emulsion, 39 wt % | 30.4 |
| Tripropylene Glycol (Mono) Methyl Ether | 5.1 |
| Triethyl Phosphate | 5.1 |
| N-methyl-2-pyrrolidone | 5.1 |
| RM-8W (18%) | 14.0 |
| BYK346 | 1.0 |
| Leocol TDN-90-80 (79%) | 6.9 |
| Ammonia, 7% | 0.5 |
| Total | 147.2 |
| Water (g) in final formulation | 99.7 |
| PVDF/Acrylic | 70/30 |

| Working Example 4 | grams |
|---|---|
| Example A, emulsion, 35 wt % | 79.1 |
| Example A3 emulsion, 40 wt % | 30.4 |
| Tripropylene Glycol (Mono) Methyl Ether | 5.1 |
| Triethyl Phosphate | 5.1 |
| N-methyl-2-pyrrolidone | 5.1 |
| RM-8W (18%) | 14.0 |
| BYK346 | 1.0 |
| Leocol TDN-90-80 (79%) | 6.9 |
| Ammonia, 7% | 0.5 |
| Total | 147.2 |
| Water (g) in final formulation | 99.7 |
| PVDF/Acrylic | 70/30 |

| Working Example 5 | grams |
|---|---|
| Example A, emulsion, 35 wt % | 79.1 |
| Example A4 emulsion, 47 wt % | 25.2 |
| Tripropylene Glycol (Mono) Methyl Ether | 5.1 |
| Triethyl Phosphate | 5.1 |
| N-methyl-2-pyrrolidone | 5.1 |
| RM-8W (18%) | 12.0 |
| BYK346 | 1.0 |
| Leocol TDN-90-80 (79%) | 6.9 |
| Ammonia, 7% | 0.5 |
| Total | 140 |
| Water (g) in final formulation | 92.9 |
| PVDF/Acrylic | 70/30 |

| Comparative Example 4 | grams |
|---|---|
| Example A, emulsion, 35 wt % | 79.1 |
| Example A5 emulsion, 40 wt % | 30.4 |
| Tripropylene Glycol (Mono) Methyl Ether | 5.1 |
| Triethyl Phosphate | 5.1 |
| N-methyl-2-pyrrolidone | 5.1 |
| RM-8W (18%) | 14.0 |
| BYK346 | 1.0 |
| Leocol TDN-90-80 (79%) | 6.9 |
| Ammonia, 7% | 0.5 |
| Total | 147.2 |
| Water (g) in final formulation | 99.7 |
| PVDF/Acrylic | 70/30 |

| Comparative Example 5 | grams |
|---|---|
| Example A, emulsion, 35 wt % | 79.1 |
| Example A6 emulsion, 40 wt % | 30.4 |
| Tripropylene Glycol (Mono) Methyl Ether | 5.1 |
| Triethyl Phosphate | 5.1 |
| N-methyl-2-pyrrolidone | 5.1 |
| RM-8W (18%) | 14.0 |
| BYK346 | 1.0 |
| Leocol TDN-90-80 (79%) | 6.9 |
| Ammonia, 7% | 0.5 |
| Total | 147.2 |
| Water (g) in final formulation | 99.7 |
| PVDF/Acrylic | 70/30 |

Adhesion Test Description:

The dry adhesion was evaluated using ASTM D3359 Crosshatch method by applying and removing pressure-sensitive tape over cuts made in the film. Each panel was crosshatched with a PAT crosshatcher. Eleven parallel cuts were made one-tenth of an inch apart followed by parallel cuts one-tenth of an inch apart, perpendicular to and on top of the first set. The crosshatched area was then tested for pick-off of the coating using #99 Permacel Tape. The adhesion was reported with the number of squares remaining in the scribed area. The higher the number, the better the adhesion was. For example, 100% means no pick-off of coating and 0% means all film was picked off. The wet adhesion was evaluated by using the same procedure as the dry adhesion described above. However, prior to the test, panels are put in distilled water at 38° C. for 24 hours.

TABLE 5

Coating performance from the above working examples and comparative examples:

| | Working Example | | | |
|---|---|---|---|---|
| | 2 | 3 | 4 | 5 |
| Film Formation | Smooth, crack free | Smooth, crack free | Smooth, crack free | Smooth, crack free |
| X-hatch Adhesion (Dry) | 100% | 100% | 100% | 100% |
| X-hatch Adhesion (Wet) | 10% | 10% | 70% | 10% |
| MEK Resistance | >100 | >100 | 95 | >100 |
| Gloss, 60 Degree | 99 | 105 | 100 | 105 |
| Color | Transparent | Transparent | Transparent | Transparent |

TABLE 6

| | Comparative Example | |
|---|---|---|
| | 4 | 5 |
| Film Formation | Smooth, crack free | Smooth, crack free |
| X-hatch Adhesion (Dry) | 100% | 100% |
| X-hatch Adhesion (Wet) | 98% | 98% |
| MEK Resistance | 80 | 20 |
| Gloss, 60 Degree | 100 | 100 |
| Color | Yellow | Yellow |

All the coatings formulated in working examples 2 to 5 and comparative examples 4 to 5 show good film formation with smooth and crack-free surface. Gloss values measured at 60 degrees are more or less the same in all examples. The dry adhesion achieves 100% in all examples. The key property to differentiate the performance of coatings in working examples 2 to 5 and comparative examples 4 to 5 is the color of the final coatings. In case of working examples 2 to 5, the color of the coatings is transparent. On the other hands, coatings in comparative examples 4 and 5 show a yellow appearance. Good coatings require transparent appearance. Since all ingredients in the coating formulations of working examples 2 to 5 and comparative examples 4 to 5 are the same except the acrylic emulsion ingredient, it is therefore revealed that the acrylic emulsion recipe with the right choice of surfactants determine the color of the final coatings. In other words, the surfactant choice of the acrylic emulsion recipes in examples A1 to A4 emulsion is able to provide the final coatings with transparent appearance while the surfactant choice of the acrylic emulsion recipes in examples A5 to A6 emulsion is not able to do so.

Another property to examine is the wet adhesion property. Formulations in comparative examples 4 to 5 show 98% wet adhesion, followed by formulations in working example 4 that shows 70% wet adhesion. Formulations in working examples 2, 3 and 5 only show 10% wet adhesion. This difference in wet adhesion is due to the choice of surfactants (in case of comparative example 4 to 5) and molecular weight (in case of working example 4) in the acrylic emulsion part of the formulations. In other words, the surfactant choice in examples A5 and A6 emulsion can provide the best wet adhesion but very poor film appearance (yellow). In coating applications, film appearance remains the highest priority.

What is claimed is:

1. An high shear stable aqueous coating composition comprising a blend of:
   a) from 0.2 to 150 parts fluoropolymer particles having a volume average particle size of less than 240 nm, and comprising at least 50 weight percent fluoromonomer units;
   b) from 1 to 40 parts of one or more acrylic polymers;
   c) optionally from 0 to 50 parts of one or more thickeners;
   d) optionally, one or more pH adjusting agents;
   e) optionally from 0 to 50 parts of one or more additives selected from the group consisting of anti-settling agents and surfactants;
   f) optionally from 0 to 50 parts of one or more wetting agents;
   g) optionally from 0 to 150 parts of one or more coalescent agents;
   h) optionally from 0 to 50 parts of one or more pigments
   i) 100 parts water;
all parts being parts by weight based on 100 parts by weight of water, wherein said fluoropolymer in a 25% aqueous dispersion has a time to on-set of coagulation of greater than 20 minutes at 2000 rpm and/or greater than 4 minutes at 4000 rpm,
wherein the blend is not a fluoropolymer/acrylic hybrid, wherein said fluoropolymer is a polyvinylidene fluoride (PVDF) homopolymer or copolymer comprising at least 70 mole percent of vinylidene fluoride units,
and wherein said PVDF has a melt viscosity of greater than 5.0 kp, by ASTM D-3835 at 450° F. and 100 sec$^{-1}$.

2. The aqueous coating composition of claim 1 comprising:
   a) from 10 to 50 parts fluoropolymer particles having a volume average particle size of less than 200 nm, and comprising at least 50 weight percent fluoromonomer units;
   b) from 5 to 30 parts of one or more acrylic polymers;
   c) optionally from 0 to 50 parts of one or more thickeners;
   d) optionally, one or more pH adjusting agents;
   e) optionally from 0.1 to 5 parts of one or more additives selected from the group consisting of anti-settling agents and surfactants;
   f) optionally from 0 to 50 parts of one or more wetting agents;
   g) optionally from 0 to 100 parts of one or more coalescent agents;
   h) optionally from 0 to 50 parts of one or more pigments;
   i) 100 parts water;
all parts being parts by weight based on 100 parts by weight of water, wherein said fluoropolymer in a 25% aqueous dispersion has a time to on-set of coagulation of greater than 20 minutes at 2000 rpm and greater than 4 minutes at 4000 rpm.

3. The aqueous coating composition of claim 2, wherein said coalescing aid is selected from the group consisting of dipropylene glycol n-butyl ether, tripropylene glycol methyl ether, triethyl phosphate, and n-methylpyrrolidone.

4. The aqueous coating composition of claim 1, wherein the fluoropolymer particles have a volume average particle size less than 150 microns.

5. The aqueous coating composition of claim 1, wherein said fluoropolymer has a melt viscosity of greater than 20.0 kp, by ASTM D-3835 at 450° F. and 100 sec$^{-1}$.

6. The aqueous coating composition of claim 1, wherein said acrylic polymer comprises from 50 to 100 weight percent of methyl methacrylate monomer units, and from 0 to 50 weight percent of other acrylate and methacrylate monomer units.

7. The aqueous coating composition of claim 1, wherein said acrylic polymer comprises from 75 to 97 weight percent of methyl methacrylate monomer units and from 3 to 25 weight percent of $C_{1-6}$ alkyl acrylate monomer units.

8. The aqueous coating composition of claim 1, wherein said acrylic polymer comprises from 0.2 to 15 weight percent of one or more wet adhesion acrylic monomer units.

9. The aqueous coating composition of claim 8, wherein said wet adhesion monomer(s) is selected from the group consisting of acrylic acid, methacrylic acid, phosphonic acid and hydroxyethyl ethylene urea methacrylate moieties.

10. The aqueous coating composition of claim 1, wherein the said aqueous coating composition comprises one or more surfactants selected from the group consisting of sodium dodecylbenzene sulfonate and sodium alpha-olefin sulfonate.

11. The aqueous coating composition of claim 1, wherein said acrylic polymer has a molecular weight of from 50,000 to 1,000,000 g/mol.

12. The aqueous coating composition of claim 1, wherein said composition is fluorosurfactant free.

13. The aqueous coating composition of claim 1, wherein said composition contains no pigment.

14. The aqueous coating composition of claim 1, wherein said composition comprises from 0.1 to 50 parts by weight of pigment per 100 parts of fluoropolymer.

15. An article coated on at least one side with the coating of claim 1.

16. The article of claim 15, wherein said article is selected from the group consisting of metal, glass, ceramic fibers, or a textile.

17. The article of claim 16, wherein said coated article is a metal pipe, metal architectural unit, architectural fabric, fiberglass, metal sheet, or metal coil.

18. A method for forming a coated article, comprising the steps of:
1) forming a stable aqueous coating composition by forming an admixture comprising
   a) from 0.2 to 150 parts fluoropolymer particles having a volume average particle size of less than 240 nm, and comprising at least 50 weight percent fluoromonomer units;
   b) from 1 to 40 parts of one or more acrylic polymers;
   c) optionally from 0 to 50 parts of one or more thickeners;
   d) optionally, one or more pH adjusting agents;
   e) optionally from 0 to 50 parts of one or more additives selected from the group consisting of anti-settling agents and surfactants;
   f) optionally from 0 to 50 parts of one or more wetting agents;
   g) optionally from 0 to 150 parts of one or more coalescent agents;
   h) optionally from 0 to 50 parts of one or more pigments
   i) 100 parts water;
all parts being parts by weight based on 100 parts by weight of water, wherein said fluoropolymer in a 25% aqueous dispersion has a time to on-set of coagulation of greater than 20 minutes at 2000 rpm and greater than 4 minutes at 4000 rpm, wherein said fluoropolymer is a polyvinylidene fluoride(PVDF) homopolymer or copolymer comprising at least 70 mole percent of vinylidene fluoride units, and wherein said PVDF has a melt viscosity of greater than 5.0 kp, by ASTM D-3835 at 450° F. and 100 sec$^{-1}$;
2) coating at least one surface of an article with said aqueous coating composition;
3) drying the coating on said coated article to form an article having directly thereon a coalesced coating layer, and
wherein the blend is not a PVDF/acrylic hybrid.

19. An high shear stable aqueous coating composition comprising a blend of:
   a) from 0.2 to 150 parts fluoropolymer particles having a volume average particle size of less than 240 nm, and comprising at least 50 weight percent fluoromonomer units;
   b) from 1 to 40 parts of one or more acrylic polymers;
   c) optionally from 0 to 50 parts of one or more thickeners;
   d) optionally, one or more pH adjusting agents;
   f) optionally from 0 to 50 parts of one or more wetting agents;
   g) optionally from 0 to 150 parts of one or more coalescent agents;
   h) optionally from 0 to 50 parts of one or more pigments
   i) 100 parts water;
all parts being parts by weight based on 100 parts by weight of water, wherein said fluoropolymer in a 25% aqueous dispersion has a time to on-set of coagulation of greater than 20 minutes at 2000 rpm and/or greater than 4 minutes at 4000 rpm,
wherein the blend is not a fluoropolymer/acrylic hybrid, wherein the said aqueous coating composition comprises one or more surfactants selected from the group consisting of sodium dodecylbenzene sulfonate and sodium alpha-olefin sulfonate.

* * * * *